United States Patent [19]
Wünsch et al.

[11] Patent Number: 6,025,456
[45] Date of Patent: Feb. 15, 2000

[54] POLYURETHANES

[75] Inventors: Thomas Wünsch, Speyer; Ria Kress, Ludwigshafen; Werner Loch, Appenweier; August Lehner, Rödersheim-Gronau; Albert Kohl, Laumersheim; Norbert Schneider, Altrip; Uwe Burkhardt, Frankenstein, all of Germany

[73] Assignee: EMTEC Magnetics GmbH, Germany

[21] Appl. No.: 09/036,692

[22] Filed: Mar. 9, 1998

Related U.S. Application Data

[62] Division of application No. 08/741,910, Oct. 31, 1996, abandoned.

[30] Foreign Application Priority Data

Nov. 2, 1995 [DE] Germany .............................. 19540812

[51] Int. Cl.⁷ ................................................... C08G 18/64
[52] U.S. Cl. ...................... 528/79; 528/85; 428/694 BL; 428/694 BY; 524/435; 524/785
[58] Field of Search ........................ 528/79, 85; 524/735, 524/785; 428/694 BL, 694 BY

[56] References Cited

U.S. PATENT DOCUMENTS 4,568,612 2/1986 Lehner et al. .......................... 360/134
4,576,855 3/1986 Okina et al. ............................. 428/215

*Primary Examiner*—Rachel Gorr
*Attorney, Agent, or Firm*—Keil & Weinkauf

[57] ABSTRACT

Hydroxyl-containing polyurethanes I are composed essentially of a) a diisocyanate of 6 to 30 carbon atoms (component II), b) a component III comprising
  α) an aliphatic diol of 2 to 20 carbon atoms or
  β) an aromatic-aliphatic or aromatic-cycloaliphatic diol of 8 to 30 carbon atoms having nonphenolic hydroxyl groups as hydroxyl groups of the diol and c) a polyhydric alcohol having at least 3 hydroxyl groups, 3 to 18 carbon atoms and nonphenolic hydroxyl groups as hydroxyl groups of the alcohol (component IV), the amounts of components II to IV being such that the total number of nonphenolic hydroxyl groups is from 1.1 to 5.0 per isocyanate group of II.

The polyurethanes can be used as binders or binder components for pigment-containing coatings, in particular for the production of magnetic recording materials.

5 Claims, No Drawings

POLYURETHANES

This application is a divisional application of Ser. No. 08/741,910, filed Oct. 31, 1996, now abandond, The present invention relates to polyurethanes I composed essentially of a) a diisocyanate of 6 to 30 carbon atoms (component II), b) a component III comprising
 α) an aliphatic diol of 2 to 20 carbon atoms or
 β) an aromatic-aliphatic or aromatic-cycloaliphatic diol of 8 to 30 carbon atoms having nonphenolic hydroxyl groups as hydroxyl groups of the diol and c) a polyhydric alcohol having at least 3 hydroxyl groups, 3 to 18 carbon atoms and nonphenolic hydroxyl groups as hydroxyl groups of the alcohol (component IV), the amounts of components II to IV being such that the total number of nonphenolic hydroxyl groups is from 1.1 to 5.0 per isocyanate group of II.

The present invention furthermore relates to a process for the preparation of the polyurethanes, their use as binders or binder components for pigment-containing coatings and magnetic recording materials, and novel binder systems and coated articles, in particular magnetic recording materials, containing such binder systems.

Aqueous and organic dispersions which cotnain a color pigment or magnetic pigment and a binder are widely used for the production of colored or magnetic finishes and coatings (Ullmann's Encyclopedia of Industrial Chemistry, 5th edition, Vol. 20, pages 243–369, VCH Publishers Inc., Weinheim-New York, 1992).

For the preparation of the finishes, these suspensions are applied to a surface or a substrate. After removal of the solvent, the binder dries physically or cures chemically by crosslinking.

It is known that various groups of substances, for example polyurethanes, are suitable binders in magnetic recording media.

Thus, DE-A 32 27 164 describes magnetic layers which contain at least 50% by weight of a thermoplastic polyurethane as a binder for the magnetic pigment.

However, such binders have the disadvantage that they dry relatively slowly and thus present problems in further processing, for example during calendering. Furthermore, the final hardness of the binder and the increase in gloss development are often insufficient.

It is an object of the present invention to provide binders which solve the stated problems in a technically simple manner.

We have found that this object is achieved by the polyurethanes I defined at the outset, a process for their preparation, their use as binders for pigment formulations, pigment-containing coatings and magnetic recording media, and novel binders and pigment formulations and magnetic recording media which contain such binders.

Suitable compounds II are diisocyanates of 6 to 30 carbon atoms. Aliphatic acyclic diisocyanates, such as hexamethylene 1,5-diisocyanate and hexamethylene 1,6-diisocyanate, aliphatic cyclic diisocyanates, such as cyclohexylene 1,4-diisocyanate, dicyclohexylmethane diisocyanate and isophorone diisocyanate of the formula

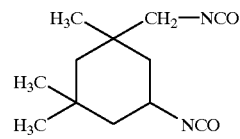

and aromatic diisocyanates, such as toluylene 2,4-diisocyanate, toluylene 2,6-diisocyanate, m-tetramethylxylene diisocyanate, p-tetramethylxylene diisocyanate, tetrahydronaphthylene 1,5-diisocyanate and diphenylenemethane 4,4'-diisocyanate, and mixtures of such compounds can advantageously be used.

Suitable components III are primarily aliphatic diols of 2 to 20, preferably 2 to 10, carbon atoms, such as 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol and 2,2-dimethyl-1,4-butanediol, neopentylglycol hydroxypivalate, diethylene glycol, triethylene glycol and methyldiethanolamine, and aromatic-aliphatic or aromatic-cycloaliphatic diols of 8 to 30 carbon atoms having nonphenolic hydroxyl groups as hydroxyl groups of the diol, heterocyclic ring systems or preferably isocyclic ring systems, such as naphthalene derivatives or in particular benzene derivatives, such as bisphenol A, symmetrically diethoxylated bisphenol A, symmetrically dipropoxylated bisphenol A, bisphenol F derivatives or bisphenol A derivatives having higher degrees of ethoxylation or propoxylation and mixtures of such compounds being suitable as aromatic structures, and mixtures of such compounds.

The components III may carry functional groups, for example neutral groups such as siloxane groups, basic groups, in particular tertiary amino groups, or acidic groups or salts thereof or groups which are readily converted into acidic groups.

Acidic groups are in particular the phosphoric acid, phosphonic acid, sulfuric acid, sulfonic acid or carboxyl groups.

Groups which are readily converted into acidic groups are, for example, the ester group or salts, preferably of the alkali metals, such as sodium or potassium.

Acidic groups may be introduced into the components III, for example, by reaction of internal anhydrides of polybasic vcarboxylic acids, such as maleic anhydride, succinic anhydride, phthalic anhydride and adipic anhydride, with excess hydroxyl groups of the components III.

An example of such a compound III is diethyl diethanolaminomethylenephosphonate (Fyrol 6).

Suitable components IV are polyhydric alcohols having at least 3, in particular from 3 to 5, hydroxyl groups, 3 to 18, preferably 3 to 6, carbon atoms and nonphenolic hydroxyl groups as hydroxyl groups of the alcohol, such as reaction products of trimethylolpropane with ethylene oxide and/or propylene oxide, or preferably glycerol, trimethylolpropane, triethanolamine, pentaerythritol, ethoxylated pentaerythritol, ethoxylated di-trimethylolpropane or mixtures of such alcohols.

According to the invention, the amounts of components II to IV should be such that the total number of nonphenolic hydroxyl groups is from 1.1 to 5.0 per isocyanate group of II and the rection product therefore has free hydroxyl groups.

The number of free hydroxyl groups can be determined according to DIN 53240.

The reaction to give the novel polyurethanes I can be carried out in a manner known per se, the presence of a catalyst, preferably of a tertiary amine, such as triethylamine, tributylamine, diazabicyclo(2.2.2)octane, N-methylpyridine or N-methylmorpholine, being advisable. Further suitable catalysts are organometallic compounds, such as dibutyltin dilaurate, and metal salts, such as tin octoate, lead octoate or zinc stearate. The amount of the catalysts is in general from 1 to 500 ppm by weight, based on the total amount of all starting materials II to IV.

The presence of a solvent or diluent is not necessary but is preferred.

Suitable solvents or diluents are hydrocarbons, in particular toluene, xylene or cyclohexane, esters, in partiuclar ethyglycol acetate, ethyl acetate or butyl acetate, amides, in particular dimethylformamide or N-methylpyrrolidone, sulfoxides, in particular dimethyl sulfoxide, ketones, in particular methyl ethyl ketone or cyclohexanone, ethers, in particular diisopropyl ether or methyl tert-butyl ether, or preferably cyclic ethers, in particular tetrahydrofuran or dioxane. The solvents or diluents may be used individually or as a mixture.

The compounds III and IV are initially taken for the reaction, and the component II is added.

The reaction is carried out as a rule at from 20 to 100° C., preferably from 50 to 70° C., resulting in reaction times of from 2 to 6 hours.

The polyurethane I can be isolated from the reaction mixture by known methods, for example by extraction, precipitation or spray-drying, or can advantageously be used for the preparation of the dispersion stated at the outset.

For the preparation of pigment formulations, the pigments, in particular color pigments and magnetic pigments, are mixed with the polyurethanes I and, if required, additives in the absence of a solvent or, preferably, in the presence of at least one of the abovementioned diluents in a manner known per se.

The pigment formulation can be isolated from the mixture by removing the diluent or can preferably be used without isolation for further processing.

If the polyurethanes I are used as binders or binder components, said polyurethanes should advantageously have a number average molecular weight of from 500 to 15,000, preferably from 1500 to 5000.

The polymeric materials I may be used alone or together with, as a binder, a compound which promotes crosslinking of the polymeric materials I.

Preferred crosslinking components V are polyfunctional isocyanates, in particular those which have more than two NCO groups per molecule and a number average molecular weight of from 500 to 5000, preferably from 500 to 2000. Such polyfunctional isocyanates can be obtained in a manner known per se by reacting hexamethylene diisocyanate, isophorone diisocyanate or, preferably, toluylene diisocyanate with a triol or diol, in particular trimethylolpropane or diethylene glycol, or by biuret or isocyanurate formation.

The amount of the polyfunctional isocyanate should advantageously be such that the ratio of the number of isocyanate groups to the number of nonphenolic hydroxyl groups of the polyurethane I is from 0.3:1 to 2.0:1, preferably from 0.5:1 to 1.5:1.

The number of isocyanate groups of the polyfunctional isocyanate may be determined according to DIN EN 1242.

The polyfunctional isocyanates may be used alone or as a mixture with other crosslinking agents.

The polymeric materials I and the reaction products of the polymeric materials I with a crosslinking agent may be used alone or as a mixture with at least one further binder.

Suitable further binders are polyurethanes, preferably polyurethanes having acidic groups, such as sulfonate or phosphonate groups, polyacrylates, polymethacrylates, polyacrylamide, vinyl polymers, such as polystyrene, polyvinyl chloride, polyvinyl acetate, polyvinyl propionate and polyacrylonitrile, cellulose-containing binders, such as cellulose esters, in particular cellulose nitrates, cellulose acetates, cellulose acetopropionate and cellulose acetobutyrate, phenoxy resins and epoxy resins, which may be obtained in a manner known per se.

The additives used are known to be dispersants, such as higher fatty acids, eg. stearic acid, or salts thereof, fillers, such as inorganic and organic pigments, eg. alumina, silica, titanium dioxide, carbon black, polyethylene, polypropylene, chalking inhibitors, eg. antimony oxide, or thixotropic substances, eg. amorphous silica.

The mixtures of pigment formulation and, if required, at least one further binder, additives or diluents are usually used as coating materials.

The coating materials may contain the novel pigment formulations alone or as a mixture with other pigments or pigment formulations.

Such coating materials are particularly important in the production of magnetic recording materials. For this purpose, pigment formulations comprising a magnetic pigment and a polyurethane I can be dispersed in a mixture of a solvent or diluent, if necessary with fillers, dispersants, a further binder and further additives, such as a lubricant, or one of the abovementioned crosslinking agents, in a manner known per se, and applied to a nonmagnetic substrate. After orientation of the ferromagnetic pigments in a strong magnetic field, the further processing can be carried out in the usual manner, for example by removal of the solvent or diluent and, if required, curing of the binder with final calendering.

Suitable magnetic pigments are the conventional oxide pigments, such as $\gamma\text{-Fe}_2\text{O}_3$, $\gamma\text{-Fe}_3\text{O}_4$ or $\text{CrO}_2$ or metallic pigments, such as Fe, Co and Ni. As is generally the case, these pigments can contain further elements or compounds.

Suitable solvents or diluents are in general water, ethers, such as tetrahydrofuran and dioxane, ketones, such as methyl ethyl ketone or cyclohexanone, esters, such as ethyl acetate, or hydrocarbons, such as alkanes or aromatics, or mixtures of such compounds.

The lubricants usually used are carboxylic acids of 10 to 20 carbon atoms, in partiuclar stearic acid or palmitic acid, or derivatives of carboxylic acids, such as salts, esters and amides thereof.

The conventional rigid or flexible substrates may be used as nonmagnetic and nonmagnetizable substrates, in partiuclar films of linear polyesters, such as polyethylene terephthalate, which are generally from 4 to 200 $\mu$m, in particular from 6 to 36 $\mu$m, thick.

In the production of magnetic recording media, a plurality of magnetic layers, at least one of which contains a layer of a novel pigment formulation, may be applied to the substrate.

In the examples and comparative examples which follow, parts are by weight unless stated otherwise.

EXAMPLES

Preparation of the Hydroxyl-containing Polyurethanes

Example 1

608.20 kg of diphenylenemethane 4,4'-diisocyanate were added to a mixture of 124.08 kg of Fyrol 6, 65.20 kg of trimethylolpropane, 202.40 kg of neopentyl glycol and 1000.00 kg of tetrahydrofuran in the course of 2 hours while stirring, so that the temperature of the mixture did not exceed 60° C. Thereafter, stirring was continued for 30 minutes, 15 g of dibutyltin dilaurate were added and stirring was continued for a further 2 hours.

Example 2

A solution of 139.2 g of toluylene diisocyanate in 170.1 g of tetrahydrofuran was added to a mixture of 252.8 g of ethoxylated bisphenol A, 26.8 g of trimethylolpropane and 93.2 g of tetrahydrofuran at 60° C. in the course of 3 hours while stirring. Thereafter, 0.2 g of dibutyltin dilaurate was added and stirring was continued at 60° C. until the reaction was complete.

Example 3

A solution of 1250 g of diphenylenemethane 4,4'-diisocyanate in 1528 g of tetrahydrofuran was added to a mixture of 519 g of neopentyl glycol, 85.5 g of hydroxyalkyl polydimethylsiloxane (H-SI 6460, from Th. Goldschmidt AG), 134 g of trimethylolpropane and 246.2 g of tetrahydrofuran at 60° C. in the course of 3 hours while stirring. Thereafter, 1 g of dibutyltin dilaurate was added and stirring was continued at 60° C. until the reaction was complete.

Example 4

A solution of 1650 g of diphenylenemethane 4,4'-diisocyanate in 2017 g of tetrahydrofuran was added to a mixture of 624 g of neopentyl glycol, 214.4 g of trimethylolpropane and 279.5 g of tetrahydrofuran at 60° C. in the course of 3 hours while stirring. Thereafter, 1.2 g of dibutyltin dilaurate were added and stirring was continued at 60° C. until the reaction was complete.

Example 5

A solution of 147.0 g of isophorone diisocyanate in 179.7 g of tetrahydrofuran was added to a mixture of 209.2 g of ethoxylated bisphenol A, 25.3 g of trimethylolpropane and 78.2 g of tetrahydrofuran at 60° C. in the course of 3 hours while stirring. Thereafter, 0.2 g of dibutyltin dilaurate was added and stirring was continued at 60° C. until the reaction was complete.

Example 6

A solution of 473.6 g of toluylene diisocyanate in 578.8 g of tetrahydrofuran was added to a mixture of 320.6 g of 1,6-hexanediol, 52.1 g of trimethylolpropane, 2.05 g of diethyl N,N-bis(2-hydroxyethyl)aminoethylphosphonate (Fyrol 6, from Akzo Nobel AG) and 124.9 g of tetrahydrofuran at 60° C. in the course of 3 hours while stirring. Thereafter, 0.4 g of dibutyltin dilaurate was added and stirring was continued at 60° C. until the reaction was complete.

Example 7

A solution of 264.3 g of diphenylenemethane 4,4'-diisocyanate in 323 g of tetrahydrofuran was added to a mixture of 109.9 g of neopentyl glycol, 25.8 g of trimethylolpropane and 45.3 g of tetrahydrofuran at 60° C. in the course of 3 hours while stirring. Thereafter, 0.2 g of dibutyltin dilaurate was added and stirring was continued at 60° C. until the rection was complete.

Preparation of a Coating Material

Example 900 parts by weight of magnetic pigments (600 parts of $CrO_2$, 300 parts of Co magnetite), 50 parts by weight of $Al_2O_3$, 300 parts by weight of a polyurethane having a number average molecular weight of 16,000, 90 parts by weight of a polymeric dispersant and 110 parts by weight of a novel polyurethane according to Example 7 were dispersed in 1300 parts by weight of tetrahydrofuran by means of 4500 parts by weight of ceramic balls in the course of 8 hours. Thereafter, 200 parts by weight of a polyurethane having a number average molecular weight of 70,000 were added and dispersing was continued for a further 3 hours.

The dispersion was then mixed with 70 parts by weight of a polyisocyanate (Desmodur L, from Bayer AG) and the mixture was applied to a polyethylene terephthalate film.

After orientation of the magnetic pigments, the film was dried at 80° C., calendered (70° C./200 kg/cm) and slit into 3.81 mm wide tapes.

The tapes had excellent magnetic properties.

A gloss of 118 was measured for the freshly prepared dispersion and a gloss of 117 for the stored dispersion.

The gloss measurement was carried out using a Dr. Lange reflectometer (manufactuer: Erichsen GmbH & Co. KG, Hemer-Sundwig) in accordance with the operating instructions at an angle of 60°. The higher the gloss, the better is the dispersing.

The magnetic layer had a microhardness of 3.5 after heating at 50° C., of 6.1 after 5 hours, of 9.9 after 25 hours and of 11.0 after 50 hours.

The microhardness was determined using a Micro-Duromat 4000 and a Polywar-MET (both from Reichert-Jung) in accordance with the operating instructions. The higher the measured values, the greater is the microhardness.

Comparative Example

A dispersion and a magnetic recording medium according to the example were prepared, the novel polyurethane being replaced by Pioloform FN 50 (from Wacker).

A gloss of 114 was measured for the freshly prepared dispersion and a gloss of 102 for the stored dispersion.

The magnetic layer had a microhardness of 2.9 after heating at 50° C., of 5.8 after 5 hours, of 8.3 after 25 hours and of 9.3 after 50 hours.

We claim:

1. A binder system curable by crosslinking and comprising:
   a hydroxyl-containing polyurethane I consisting essentially of:
      a) a dilsocyanate of 6 to 30 carbon atoms (component II) and selected from the group consisting of hexamethylene 1,5-diisocyanate, hexamethylene 1,6-diisocyanate, cyclohexylene 1,4-diisocyanate, dicyclohexylmethane diisocyanate, isophorone diisocyanate, toluylene 2,4-diisocyanate, toluylene 2,6-diisocyanate, m-tetramethylxylene diisocyanate, p-tetramethylxylene diisocyanate, tetrahydronaphthylene 1,5-diisocyanate and diphenylenemethane 4,4'-diisocyanate;
      b) a component III consisting essentially of
         α) an aliphatic diol of 2 to 20 carbon atoms or
         β) an aromatic-aliphatic or aromatic-cycloaliphatic diol of 8 to 30 carbon atoms having nonphenolic hydroxyl groups as hydroxyl groups of the diol; and c) a polyhydric alcohol having at least 3 hydroxyl groups, 3 to 18 carbon atoms and nonphenolic hydroxyl groups as hydroxyl groups of the alcohol (component IV); the amounts of components II to IV being such that the total number of nonphenolic hydroxyl groups is from 1.1 to 5.0 per isocyanate group of II and containing magnetic pigments.

2. A binder system as claimed in claim 1, wherein the diisocyanate (component II) is selected from the group consisting of toluylene 2,4-diisocyanate, toluylene 2,6-diisocyanate, m-tetramethylxylene diisocyanate, p-tetramethylxylene diisocyanate, tetrahydronaphthylene 1,5-diisocyanate and diphenylenemethane 4,4'-diisocyanate.

3. A coated article obtained by application of a layer containing a binder system as claimed in claim 1 and subsequent crosslinking.

4. A magnetic recording material containing the binder system of claim 1.

5. A magnetic recording material obtained by applying a layer containing a binder system as claimed in claim 1 and subsequent crosslinking.

* * * * *

UNITED STATES PATENT AND TRADEMARK OFFICE
CERTIFICATE OF CORRECTION

PATENT NO.: 6,025,456

DATED: February 15, 2000

INVENTOR(S): WÜENSCH et al.

It is certified that error appears in the above-identified patent and that said Letters Patent is hereby corrected as shown below:

Column 6, claim 1, line 52, change "dilsocyanate" to --diisocyanate--.

Signed and Sealed this

Third Day of April, 2001

*Attest:*

NICHOLAS P. GODICI

*Attesting Officer*     *Acting Director of the United States Patent and Trademark Office*